United States Patent [19]
Hollstein

[11] Patent Number: 5,558,163
[45] Date of Patent: Sep. 24, 1996

[54] CONTROL SYSTEM FOR UTILITY VEHICLE

[75] Inventor: Jürgen Hollstein, Mannheim, Germany

[73] Assignee: Deere & Company, Moline, Ill.

[21] Appl. No.: 506,673

[22] Filed: Jul. 25, 1995

[30] Foreign Application Priority Data

Aug. 16, 1994 [DE] Germany ............ 44 28 824.7

[51] Int. Cl.$^6$ ............................................. A01B 41/06
[52] U.S. Cl. ........................................ 172/2; 172/4
[58] Field of Search .................... 37/348; 172/2, 172/3, 4, 4.5, 6, 7, 9; 280/912; 364/424.07; 56/10.2 D, 10.2 E, 10.2 F; DIG./15, 121.96

[56] References Cited

U.S. PATENT DOCUMENTS

| | | |
|---|---|---|
| 4,067,394 | 10/1978 | Deckler . |
| 4,641,490 | 2/1987 | Wynn et al. ............ 56/10.2 E |
| 4,747,462 | 5/1988 | Herrmann et al. . |
| 4,776,153 | 10/1988 | DePauw et al. ........... 56/10.2 E |
| 4,822,962 | 4/1989 | MacCourt ............... 172/2 X |
| 4,967,868 | 11/1990 | Schwarz et al. . |
| 4,969,527 | 11/1990 | Boe et al. . |
| 5,224,551 | 7/1993 | Sukup .................. 172/2 X |
| 5,240,079 | 8/1993 | Schmidt ................. 172/2 X |
| 5,261,495 | 11/1993 | Szymczak ............... 172/2 |

*Primary Examiner*—Terry Lee Melius
*Assistant Examiner*—Robert Pezzuto

[57] ABSTRACT

A control system controls a plurality of control devices (such as a four wheel drive control valve, a differential lock control valve and a PTO control valve) of a work vehicle having an implement hitch coupled to a hitch actuator which is controlled by a hitch control unit. The control system has operating switches for adjusting the operation modes of the control devices and the hitch actuator. The control unit also has means for activating and deactivating an automatic mode for the control devices in response to manipulation of a first switch and means for activating the automatic mode upon a manual operation signal delivered to the hitch control unit to change the operation modes of the functions of the control devices. The control system includes an automatic switch which is manipulatable independent from the other switches. A sensor senses the position of the hitch. The control unit controls the control devices as a function of sensed hitch position and according to a predetermined program when an automatic mode is activated.

14 Claims, 2 Drawing Sheets

CONTROL SYSTEM FOR UTILITY VEHICLE

BACKGROUND OF THE INVENTION

The invention relates to a control system for the control of a control device of a utility vehicle, with a control unit which is electrically connected to the control device.

In agricultural, street cleaning and utility vehicles control systems may be provided, for example, in the form of clutches for the engagement of a front wheel drive into the drive-line, for a rear axle differential lock and for a power take-off shaft arranged at the rear of the vehicle. Other devices may also be included, such as, for example, a front power take-off shaft, a center and a front axle differential and supplementary control devices on the utility vehicle or on an implement attached thereto.

The control systems can be controlled by the operator from the operator's stand by switches or levers in order to control the desired devices, in particular, to engage or disengage them. In addition to the operation of these control systems, the operator must operate the steering wheel, the gas and the brake pedal, the main clutch, the gear shift lever and many further operating devices, in order to drive the vehicle. The multiplicity of operations demands a high degree of concentration by the operator. This applies in particular to procedures with constantly repetitive, monotonous operations.

During plowing or other operations in the field, for example, the operator must turn the tractor and implement at the end of the field, and perform a sequence of operations for this purpose, in which the corresponding control devices are operated. During such turning the implement is raised, the rear axle differential lock is disengaged, the power take-off shaft is disengaged and the mechanical front wheel drive is disengaged. After the turn the control devices are again actuated in order to return to the original condition.

SUMMARY OF THE INVENTION

Accordingly, an object of this invention is to provide a control system for a utility vehicle function which simplifies the operation of the utility vehicle.

A further object of the invention is to provide such a control system which relieves the operator and enhances his capability and the productivity of the utility vehicle.

These and other objects are achieved by the present invention, wherein the operations performed by the operator are automated. This simplifies the operation of the utility vehicle, relieves the operator, enhances his capability and increases the productivity of the utility vehicle.

It is proposed to apply an electronic control unit whose electric connections are linked to a separate automatic switch in the control system in the lifting device of an attached implement. Upon actuation of the automatic switch an automatic mode is activated for devices that can be selected. At that time, however, there is no change in the operating condition of the selected devices. Manual actuation of the lifting device of the attached implement will then initiate the automatic mode. During the execution of the automatic mode the selected control devices can be controlled according to a pre-selected program. Thereby the operator must only activate the automatic mode at the beginning of the operation, for example, at the beginning of the operation in the field. The initiation and execution of the steps of the operation then follows automatically upon manual actuation of the lifting device. The control of the control units can then be performed according to a preselected program in accordance with the current position of the lifting device.

During resetting of the control system of the lifting device to its initial position preferably the selected control devices are automatically returned to their particular initial position according to a pre-determined program.

A preferred field of application of the invention is seen in the turning of the operating train, tractor/implement, at the end of the field, during which a front wheel drive, a differential lock and/or a power take-off shaft must be actuated, as long as the lifting device with the attached implement is raised at the end of the field. At the beginning of the operation on the field the operator can engage the automatic mode. At the end of the field, actuation of the control system of the lifting device raises the implement from its operating position to its transport position. Simultaneously the differential lock is disengaged, so that a rotational speed equalization between the drive wheels can occur during the turn. If the lifting device is raised from its operating position by a pre-selected percentage of its maximum lifting angle, then the power take-off shaft is disengaged. The position of the lifting device can be detected by a lifting device sensor. As soon as the lifting device has reached a pre-selected maximum lift position (transport position), the front wheel drive is disengaged. In case not all of the aforementioned devices were active on actuation of the automatic mode, a correspondingly reduced automatic program is performed by the control unit.

After completion of the turning process preferably a further control program is performed, initiated by a command from the operator to lower the lifting device through which the front wheel drive and/or the differential lock are automatically re-engaged. Thereby the operations incorporated in the automatic mode and that were active before the automatic process of disengagement are again reinstated after the turning process. For reasons of safety, however, an automatic re-engagement of the power take-off shaft is not performed. As heretofore the power take-off shaft must be engaged by manual actuation of the power take-off shaft control device or switch.

This application of the control system according to the invention permits a smooth operation on the field that relieves the operator of drudgery, in which the operator can concentrate on driving the tractor at the end of the field, and in which the manipulations required of the operator are reduced to a minimum.

Once the devices are incorporated into the automatic procedure they remain incorporated there until the automatic switch is actuated once again or the ignition switch of the vehicle is turned off. The automatic switch is most appropriately configured as a push-button switch, which transmits control impulses to the control unit for the switch from normal operation, in which all devices can be actuated manually, to the automatic mode.

For safety reasons among others, however, it is appropriate to provide that the operations incorporated into the automatic mode can be overridden at any time by manual actuation of each applicable control device or switch. Thereby the automatic mode is temporarily suppressed for the particular device and the device can be actuated by the operator. In a subsequent actuation of the automatic mode the overridden devices, for example, the differential lock, are again incorporated into the automatic mode with the appropriate timing and operating condition.

According to a preferred embodiment of the invention the successful incorporation of a device into the automatic mode is indicated to the operator optically and/or acoustically, in order to signal the incorporation of the individual device into the automatic mode or their removal from the automatic mode.

The termination of the automatic mode, for example, is indicated by an acoustic signal.

Preferably each device is associated with at least one indicator light which is illuminated under normal conditions when the particular device is engaged and that is extinguished when the device is disengaged. If the device is incorporated into the automatic mode, then the indicator light indicates by a characteristic flashing mode whether the device is engaged or disengaged. When the device is engaged, for example, power take-off shaft is rotating, the indicator light flashes in a bright flashing mode, in which the light phases are longer than the dark phases. For example, the indicator light flashes rhythmically and is illuminated 90% of a period of one second and is dark for 10% of the period. When the device is disengaged, for example, power take-off shaft stopped, the indicator light flashes in a dim flashing mode in which the illuminated phases are shorter than the dark phases. For example, the indicator light flashes rhythmically and in a period of one second is illuminated 10% of the period and is dark for 90% of the period. By this control of the indicator light two additional indications of the condition can be added to the normal light indication (light, dark).

Preferably the control system contains monitoring means that continuously monitor the performance of the components included in the control and that put the indicator light into a flashing mode with a light to dark flashing mode in an approximate 1:1 ratio when malfunctions occur, for example, due to improper operation or system malfunction.

In order to reduce the possibility of malfunctions the operation of the front wheel drive and the differential lock, in particular, within the automatic mode are applied only with vehicle speeds below a pre-selected value, for example, 12 Km/hour. This should prevent an inexperienced operator from encountering a dangerous driving condition at higher speeds that are, for example, improper for a maneuver in the field with the automatic mode activated by automatically disengaging the front wheel drive or automatic engaging of the differential lock.

Furthermore it is advantageous that the control unit automatically disengages the power take-off shaft when a pre-selected vehicle speed is exceeded, for example, 12 Km/hour and that it prevents the manual re-engagement until the vehicle speed falls below the pre-selected value. The differential lock is not automatically re-engaged when the vehicle speed drops below the speed threshold.

DETAILED DESCRIPTION

Figure 1:
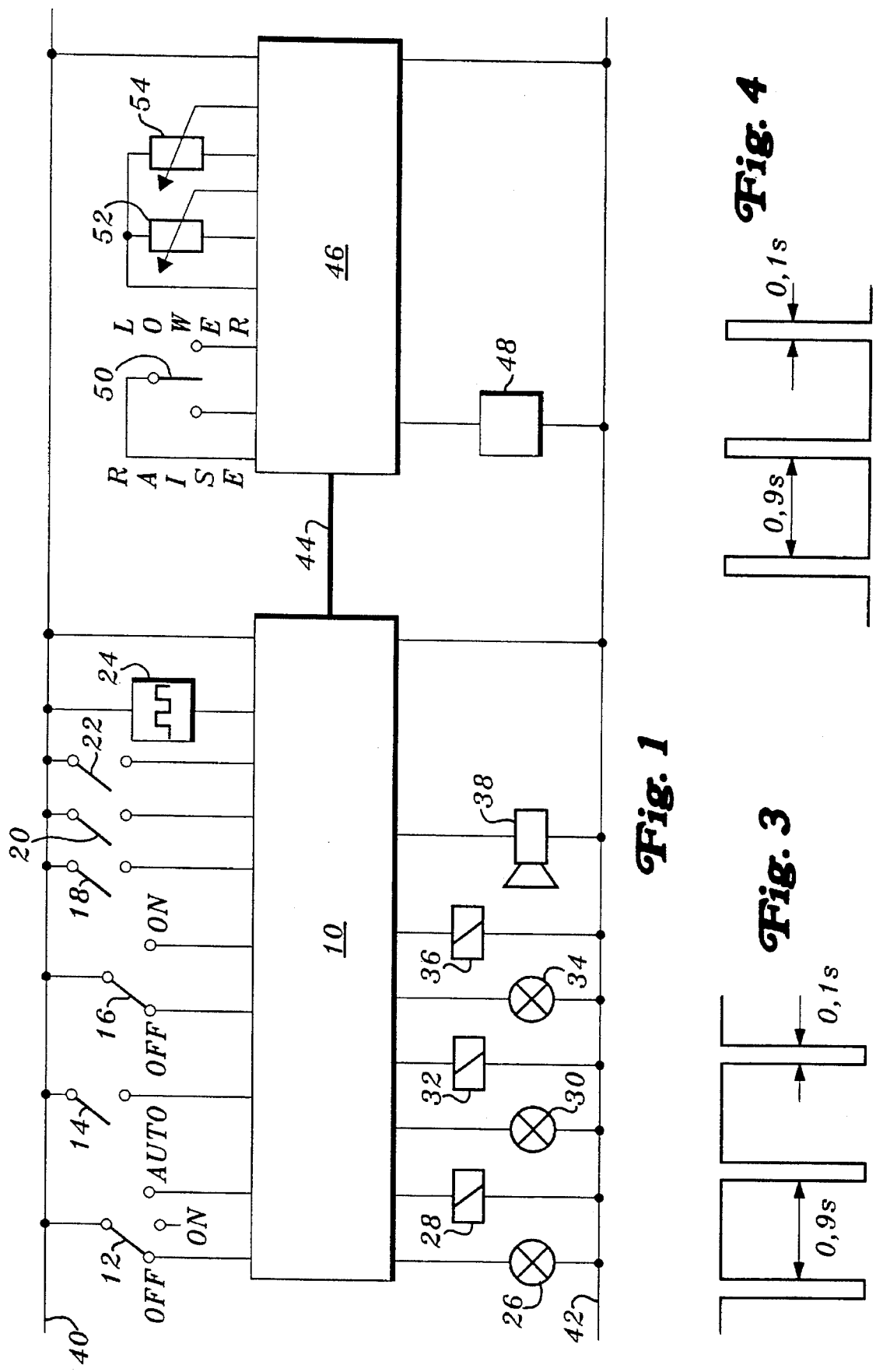
FIG. 1 is a schematic circuit diagram of a control system according to the invention.

The control system shown in FIG. 1 includes an electronic control unit 10 whose functions and limits can be programmed and which contains a read-only memory (not shown) to store values. Furthermore, the control unit 10 comprises signal processors, control relays and the like (not shown), for connecting electrically to other components.

The control unit 10 is connected to a four-wheel drive switch 12, a differential lock switch 14, a power take-off (PTO) switch 16, an automatic switch 18, two brake switches 20, 22, a vehicle speed sensor 24, a four-wheel drive indicator light 26, a four-wheel drive electromagnetic control valve 28, a differential lock indicator light 30, a differential lock electromagnetic control valve 32, a power take-off shaft indicator light 34, a PTO electromagnetic control valve 36 and an acoustic warning device 38. The control unit 10 is preferably connected to both poles 40, 42 of a vehicle battery (not shown).

The four-wheel drive switch 12 can be moved manually into stable OFF, ON and MANUAL positions. In the OFF position and the ON position the four-wheel drive electromagnetic control valve 28 is actuated in order to disengage and engage, respectively, the mechanical four-wheel drive (not shown) in the drive-line (not shown). In the AUTO position the four-wheel drive electromagnetic control valve 28 is automatically controlled with respect to the vehicle speed, the steering angle, the brake actuation and/or the actuation of the clutch etc. as it has been described, for example, in U.S. Pat. Nos. 4,747,462, 4,967,868 and German published patent application No. 3837357, all assigned to the assignee of the present application.

The differential lock switch 14 is preferably a push-button switch through which the operator can transmit control signals to the differential lock electromagnetic control valve 32 to actuate the rear axle differential gear (not shown).

The power take-off shaft switch 16 is a selector switch that can be moved manually between an ON position and an OFF position to control the PTO electromagnetic control valve 36.

The automatic switch 18 preferably is a manually operated push-button switch through which actuation signals can be transmitted to the control unit 10 which toggles the control unit 10 between a normal operating mode and an automatic mode.

The two brake switches 20 and 22 are connected with the service brakes (not shown) of the vehicle, and are actuated by application of the brakes.

Figure 4:
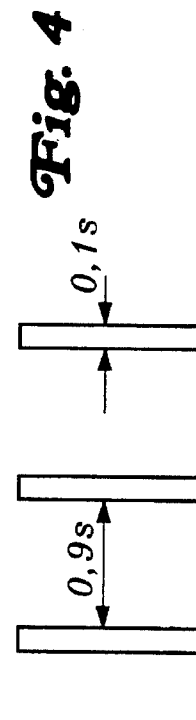
FIGS. 3 and 4 are signal timing diagrams illustrating the bright flashing mode (high duty cycle) and the dim flashing mode (low duty cycle), respectively, of the lamps which are controlled by the electronic control unit of FIG. 1.
Figure 3:
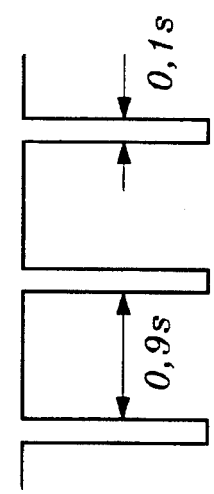

The four-wheel drive indicator light 26, the differential lock indicator light 30 and the PTO indicator light 34 indicate the operating condition of the associated devices—four wheel drive (not shown), the differential lock (not shown) and the PTO (not shown). If the indicator lights 26, 30, 34 are continuously illuminated or extinguished, they indicate that the associated device is ON or OFF, respectively, in the normal operating mode. The indicator lights 26, 30, 34 may also be flashing in bright flashing mode or high duty cycle mode illustrated by FIG. 3, or in dim flashing mode. The bright flashing mode or low duty cycle mode illustrated by FIG. 4, indicates that the automatic mode is enabled and that the corresponding device is activated. The dim flashing mode indicates that the automatic mode is enabled and that the corresponding device is inactive. The four-wheel drive electromagnetic control valve 28, the differential lock electromagnetic control valve 32 and the PTO electromagnetic control valve 36 are each connected to a corresponding electro-hydraulic clutch (not shown), for the respective four wheel drive, differential lock and PTO.

Furthermore, the control unit 10 is connected through a serial bus 44 to the hitch control system 46 for a hitch (not shown) to which an implement (not shown) can be attached.

As is well known, the hitch (not shown) is controlled by a control valve 48 which controls the flow of hydraulic oil to and from the lifting cylinders (not shown) in order to raise or lower the hitch 49. The hitch control system 46 is also supplied by the vehicle battery 40, 42 and is connected to an operating switch 50 configured as a spring-centered rocker switch, through which the operator can transmit signals for the rapid raising and lowering of the implement lifting device. Furthermore, a position transducer 52 is connected to the hitch and a position limit value transducer 54 is connected to the hitch control system 46. The transducers 52 and 54 may be potentiometers. The position transducer 52 provides a signal corresponding to the position of the hitch. The position limit value transducer 54 can be used manually to set an upper limit position for the hitch. Further details relating to a hitch control system may be found in U.S. Pat. No. 4,969,527 issued 13 Nov. 1990 and assigned to the assignee of the present application.

Figure 2:
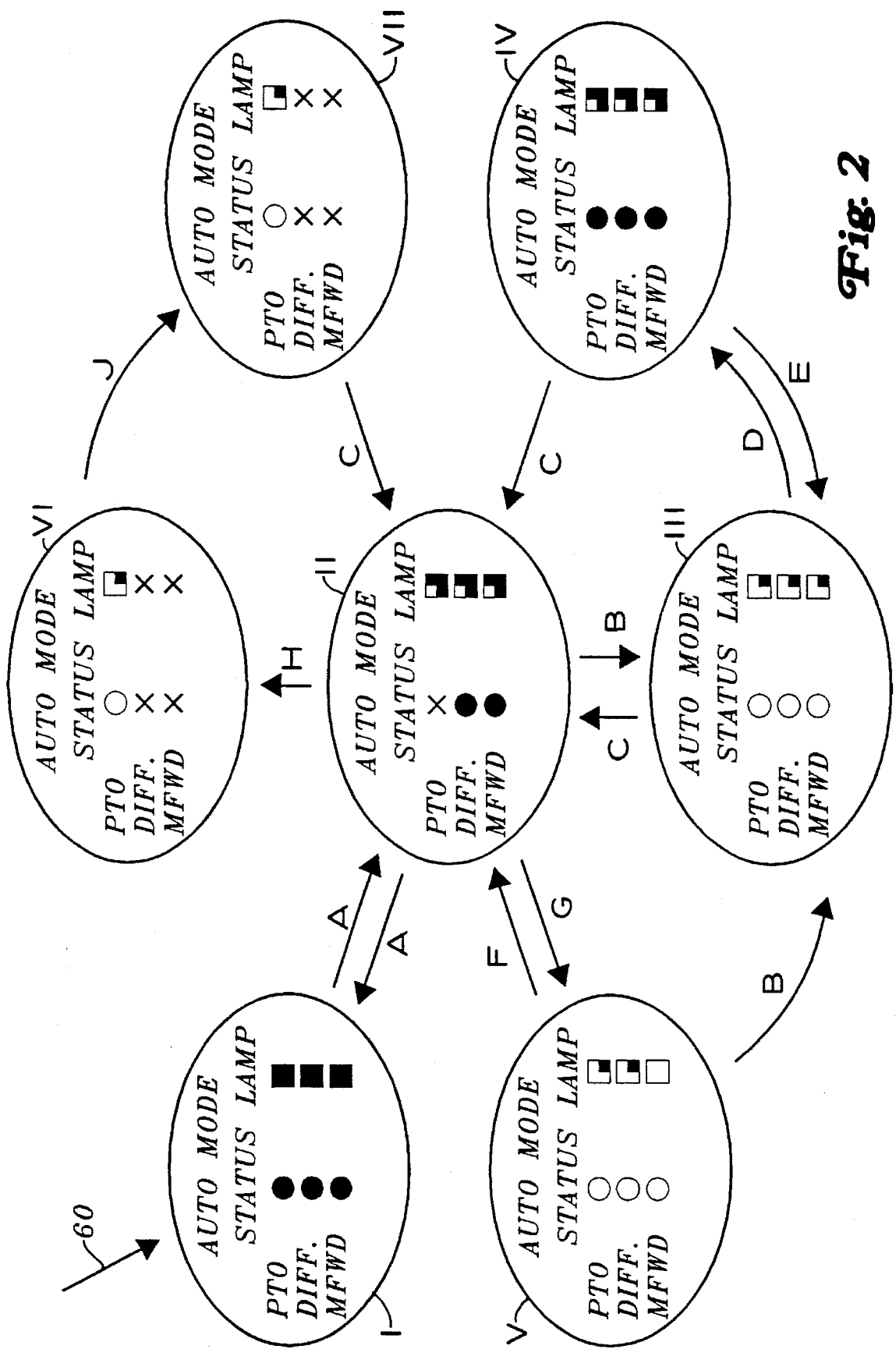
FIG. 2 is a condition diagram of the control system according to the invention.

The control unit 10 operates as shown by the condition diagram of FIG. 2 which includes operating conditions I through VII for the PTO, the rear axle differential ("DIFF.") and the mechanical front wheel drive ("MFWD").

The status of the devices are illustrated by an "X" or by a circle which is empty or filled. A filled circle indicates that the device is engaged, an empty circle that it is disengaged. An "X" indicates that the status of the device remains unchanged from its previous status.

The devices are associated with indicator lights that are symbolized as squares. A filled or an empty square indicates that the indicator light is continuously illuminated or extinguished, respectively. A square filled only in the right lower corner means that the indicator light flashes in a dim flashing mode, wherein, during a one second period it is extinguished 90% of the time of the period and is illuminated 10% of the time of the period (see FIG. 3). If the square is filled up to its upper left corner, than the indicator light is flashing in bright flashing mode, that is, during a period of one second it is extinguished 10% of the time of the period and is illuminated for 90% of the time of the period (see FIG. 4).

In the normal operating mode I the devices can be controlled through the switches 12, 14 and 16 by the operator. In the automatic modes II–VII the devices are controlled by the control unit 10 according to a pre-determined program.

FIG. 2 shows an initial condition I, that is activated when the ignition switch (not shown) is first turned on (arrow 60). In initial condition I the hitch (not shown) is in its lower position and the switches 12, 14 and 16 are turned on, so that in the normal operating mode all three devices are engaged and the associated indicator lights 26, 30, 34 are steadily illuminated. For the three devices selected here by way of example the initial condition may also include other conditions not shown here, that correspond to various switch positions and in which one or more of the devices are inactive. If one of the devices is inactive in one of the possible initial conditions that is not shown then it is not automatically engaged in the conditions II through VII in which the automatic mode is activated.

By a single actuation (arrow A) of the automatic switch 18 the system goes into the stand-by mode II, in which the automatic mode is activated but the pre-determined program is not yet executed. The devices remain engaged and the indicator lights are flashing in bright flashing mode. By a renewed actuation of the automatic switch 18 the system is returned to its initial condition I.

If, starting from the stand-by condition II, for example, at the end of the field, a RAISE signal is generated (arrow B) by the operating switch 50, then the system goes into the raising condition III. The RAISE signal causes the hitch (not shown) to raise from its operating position into its transport position. Simultaneously, the differential lock is disengaged in order to enable turning of the vehicle. When the hitch reaches a pre-determined position that can be detected by the position transducer 52 (pre-determined percentage of the maximum lifting angle above the operating height), then the PTO is disengaged. As soon as the position of the hitch has reached a maximum lift position, which can be pre-set by the position limit value transducer 54, (transport position is reached), the front wheel drive is disengaged. If not all of the aforementioned devices were active when the automatic switch 18 was actuated, the control unit 10 performs a correspondingly reduced automatic program. When a LOWER signal is generated (arrow C), the system returns from its raising condition III to the stand-by condition II. The PTO initially remains disengaged and can only be engaged manually.

When the automatic mode is activated, the automatic adjustments of the devices can be manually overridden. Therefore, it is possible, for example, starting from the raising condition III in which all devices are disengaged, to engage one or more of the devices by actuating the switches 12, 14 and/or 16. If, for example, all devices are manually engaged (arrow D) then the condition IV is reached. By disengaging all devices (arrow E) the system is returned to the stand-by condition II. If, starting from condition IV, the hitch is lowered (arrow C), then the system goes into the stand-by condition II in which the differential lock and the front wheel drive are automatically engaged, but the PTO can only be engaged manually.

Starting from the stand-by condition II, in which all devices are engaged, it is also possible to disengage one or more of the devices by actuating the switches 12, 14 and/or 16. If, for example, all devices are manually disengaged (arrow F), then the system goes into condition V. By manually engaging all devices (arrow G) the system returns to the raising condition III, in which all the devices, even the PTO, are again engaged. Starting from condition V, if the hitch is raised (arrow B) then the system goes into its raising condition III.

The four wheel drive will be controlled automatically only if the four wheel drive control switch 12 is in its AUTO position when the automatic mode is activated. In this case the automatic mode will be, however, overridden by an actuation of the brakes or by switching the four wheel drive switch 12 into its ON or OFF position. Upon braking, the four wheel drive is automatically engaged and the associated indicator light 26 is continuously illuminated. When the brakes are released or if the four wheel drive control switch 12 is returned to its AUTO position, the four wheel drive operation is again incorporated into the automatic mode with the proper timing and in the proper operating condition.

If the hitch is raised at a vehicle speed that is greater than, for example, 12 Km/hour (arrow H), then the system goes from its stand-by condition II into the high-speed condition VI, in which the PTO is disengaged, but the condition of the remaining devices is retained. If the vehicle speed again falls below 12 Km/hour (arrow J), then the system goes into the condition VII, without any change in the conditions of the devices or a change in the mode of the indicator lights. From the condition VII the system returns to its stand-by condition II by the lowering of the hitch (arrow C). Initially the PTO remains disengaged and can only be engaged manually.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A control system for controlling a plurality of control devices of a work vehicle having an implement hitch coupled to a hitch actuator which is controlled by a hitch control unit, the control system having an electronic control unit which is electrically connected to the control devices, a plurality of operating elements for adjusting the operation modes of the control devices and the hitch actuator, the electronic control unit also having means for enabling and disabling an automatic mode for the control devices in response to manipulation of a first one of the operating element and means for activating the enabled automatic mode upon a manual operation signal delivered to the hitch control unit to change the operation modes of the functions associated with the control devices, characterized by:

the first operating element comprising an automatic switch which is electrically connected to the electronic control unit and which is manipulatable independent from other of the plurality of operating elements; and a hitch position sensor electrically connected to the hitch control unit, the electronic control unit controlling the control devices as a function of sensed hitch position and according to a predetermined program when the automatic mode is activated.

2. The control system of claim 1, characterized by:

the electronic control unit also comprising means for, when the automatic mode is activated, automatically returning at least one of the control devices to an initial operating condition in response to returning the hitch to its initial condition.

3. The control system of claim 2, characterized by:

the electronic control unit also comprising means for receiving signals from the hitch control unit for controlling the pre-selected program on the basis of these signals.

4. The control system of claim 1, characterized by:

the plurality of control devices including an all-wheel drive actuator, a differential lock actuator, and a PTO actuator.

5. The control system of claim 4, wherein the electronic control unit comprises:

means for, when the automatic mode is active, applying a release signal to the differential lock actuator as soon as the hitch position sensor generates a raised position signal;

means for, when the automatic mode is active, applying an off signal to the PTO actuator as soon as the hitch position sensor generates a signal which represents a position which exceeds a predetermined percentage of a maximum raise angle; and means for, when the automatic mode is active, applying an off signal to the MFWD actuator when the hitch position sensor generates a signal representing a transport position.

6. The control system of claim 5, characterized by:

the electronic control unit comprising means for automatically applying an engagement signal to the all wheel drive actuator and for automatically applying an engagement signal to the differential lock actuator in response to manipulation of a hitch control element to a hitch lowering position from a hitch raise position.

7. The control system of claim 4, wherein the electronic control unit comprises:

means for suppressing automatic engagement operation of the PTO actuator and for permitting engagement operation of the PTO actuator only in response to manual actuation of a PTO operating element.

8. The control system of claim 1, wherein the electronic control unit comprises:

means for applying off signals to control devices and thereby deactivating the automatic mode in response to manual actuation of an operating device when the automatic mode is activated.

9. The control system of claim 1, characterized by:

a vehicle speed sensor electrically connected to the electronic control unit; and the electronic control unit comprising means for suppressing the automatic mode and permitting only manual control of selected control devices when a pre-determined vehicle speed is exceeded.

10. The control system of claim 1, characterized by:

a vehicle speed sensor electrically connected to the electronic control unit; and the electronic control unit comprises means for automatically applying a disengaging signal to the differential lock actuator when a pre-determined vehicle speed is exceeded.

11. The control system of claim 1, wherein:

the automatic switch comprises a push-button switch which transmits control impulses to the electronic control unit, the control devices being controllable only manually by the operating devices when the automatic mode is disabled.

12. The control system of claim 1, further comprising:

at least one indicator light controlled by the electronic control unit and which indicates a current operating condition of the control device and/or the current control mode of the electronic control unit.

13. The control system of claim 12, wherein:

the electronic control unit comprises means for switching the indicator light on and off, and for operating the indicator light in a high duty cycle mode and in a low duty cycle mode corresponding to an operating condition of the control device and/or the control mode.

14. The control system according to claim 12, wherein:

the electronic control unit comprises means for operating the indicator light in a high duty cycle mode as long as the automatic mode is activated and the control device is in an on condition; and the electronic control unit comprises means for operating the indicator light in a low duty cycle mode as long as the automatic mode is activated and the control device is in an off condition.

* * * * *